US008467567B2

United States Patent
Pan et al.

(10) Patent No.: US 8,467,567 B2
(45) Date of Patent: *Jun. 18, 2013

(54) CORRELATION-BASED SYSTEM FOR WATERMARKING CONTINUOUS DIGITAL MEDIA

(75) Inventors: Shien-Tai Pan, Laguna Niguel, CA (US); Victor Kai-Chieh Liang, Irvine, CA (US); Yi Li, Foothill Ranch, CA (US); Bing Wang, Aliso Viejo, CA (US); Maurice Chow, Irvine, CA (US); Hoai Le, Huntington Beach, CA (US); Richard Thai, Fountain Valley, CA (US)

(73) Assignee: Lawrence N. Ginsberg, Newport Beach, CA (US)

( * ) Notice: Subject to any disclaimer, the term of this patent is extended or adjusted under 35 U.S.C. 154(b) by 369 days.

This patent is subject to a terminal disclaimer.

(21) Appl. No.: 12/775,845

(22) Filed: May 7, 2010

(65) Prior Publication Data

US 2010/0220858 A1    Sep. 2, 2010

Related U.S. Application Data

(63) Continuation of application No. 11/260,906, filed on Oct. 28, 2005, now Pat. No. 7,715,587.

(51) Int. Cl.
*G06K 9/00* (2006.01)
*H04N 7/167* (2011.01)
(52) U.S. Cl.
USPC .......................................... 382/100; 380/200
(58) Field of Classification Search
USPC ................... 382/100, 278; 713/176; 380/200, 380/201
See application file for complete search history.

(56) References Cited

U.S. PATENT DOCUMENTS

| 7,707,422 B2* | 4/2010 | Shin et al. ...................... 713/176 |
| 7,715,587 B2* | 5/2010 | Pan et al. ....................... 382/100 |
| 7,715,588 B2* | 5/2010 | Pan et al. ....................... 382/100 |
| 2005/0050332 A1 | 3/2005 | Serret-Avila |
| 2007/0047442 A1 | 3/2007 | Snyder |
| 2010/0040255 A1* | 2/2010 | Rhoads ......................... 382/100 |

OTHER PUBLICATIONS

Simitopoulos et al. "Encryption and Watermarking for the Secure Distribution of Copyrighted MPEG video on DVD." Multimedia Systems 9, Springer-Verlag, 2003, pp. 217-227.*
Mathai et al. "Hardware Implementation Perspectives of Digital Video Watermarking Algorithms." IEEE Transacations on Signal Processing, vol. 51, No. 4, Apr. 2003, pp. 925-938.*
Kim et al. "An Entropy Masking Model for Multimedia Content Watermarking." Proceedings of the 37th Hawaii International Conference on System Sciences, 2004, pp. 1-6.*
Zhu et al. "Multiresolution Watermarking for Images and Video." IEEE Transactions on Circuits and Systems for Video Technology, vol. 9, No. 4, Jun. 1999, pp. 545-550.*
Maes, et al. "Digital Watermarking for DVD Video Copy Protection." IEEE Signal Processing Magazine, Sep. 2000, pp. 1-10.*
Hayes, John P., Computer Architecture and Organization, McGraw-Hill, 1998, p. 87.

* cited by examiner

*Primary Examiner* — Jon Chang
(74) *Attorney, Agent, or Firm* — Lawrence N. Ginsberg

(57) ABSTRACT

A correlation-based system for watermarking continuous digital media at the system application level. It is a post-compression process for watermarking where no a priori knowledge of the underlying compression algorithm is required. Per each compressed media frame, a current unique digital signature is generated based on the data from the current compressed frame plus the digital signature that has been previously generated. The signature thus generated is then used in conjunction with the next compressed frame to generate the next unique digital signature. All digital signatures are correlated according to the above process until a "reset" signal is issued. A new chain of correlated digital signatures is produced by the system with a pre-determined initial signature.

18 Claims, 5 Drawing Sheets

Initial Step-Frame #1 (Reset=1)

Transition from Frame #1 to Frame #2 (Reset=0)

Transition from Frame #2 to Frame #3 (Reset=0)

Transition from Frame #3 to Frame #4 (Reset=0)

Transition from Frame #4 to Frame #5 (Reset=1)

Transition from Frame #5 to Frame #6 (Reset=0)

CORRELATION-BASED SYSTEM FOR WATERMARKING CONTINUOUS DIGITAL MEDIA

CROSS REFERENCE TO RELATED APPLICATIONS

This is a continuation of U.S. Ser. No. 11/260,906, entitled "Correlation-Based System For Watermarking Continuous Digital Media", filed Oct. 28, 2005, now U.S. Pat. No. 7,715,587. This invention is related to U.S. Ser. No. 11/262,006, entitled, "Two Level Cross-Correlation Based System for Watermarking Continuous Digital Media", filed Oct. 28, 2005, now U.S. Pat. No. 7,715,588, by co-applicants, Pan et al, and assigned to the present assignee and is also related to the co-filed patent application, U.S. Ser. No. 12/775,886, now U.S. Pat. No. 8,175,328. U.S. Ser. No. 11/262,006 is incorporated by reference herein in its entirety.

BACKGROUND OF THE INVENTION

1. Field of the Invention

The present invention relates to multimedia authentication and more particularly to a correlation-based system for watermarking continuous digital media. The primary area for the application of the present invention is the content authentication and ownership identification for continuous digital media that are prone to active attacks such as unauthorized removal and unauthorized embedding. Furthermore, to protect the watermarks from being easily tampered or detected by unauthorized personnel, a method of "correlation" is thus introduced while watermarks are being created.

2. Description of the Related Art

Watermarking has been widely used for the applications of multimedia authentication and copyright protection. Video watermarking, in particular, is unique to other types of media watermarking in that it deals primarily with real-time continuous bitstreams. Many prior art references have focused on watermarking at the video compression level. See for example, D. Simitopoulos, N. Zissis, P. Georgiadis, V. Emmanouilidis, and M. G. Strintzis, "*Encryption and watermarking for the secure distribution of copyrighted MPEG video on DVD*," Multimedia Systems 9: pp 217-227, 2003; N. J. Mathai, D. Kundur, and A. Sheikholeslami, "*Hardware Implementation Perspectives of Digital Video Watermarking Algorithms*," IEEE Transactions on Digital Signal Processing, Vol. 51, No. 4, April 2003; S. W. Kim and S. Suthaharan, "*An Entropy Masking Model for Multimedia Content Watermarking*," Proceedings of the 37th Hawaii International Conference on System Sciences, 2004; W. Zhu, Z. Xiong, and Y. Q. Zhang, "*Multiresolution Watermarking for Images and Video*," IEEE Transactions on Circuits and Systems for Video Technology, Vol. 9, No. 4, June 1999; M. Maes, T. Kalker, J-P. Linnartz, J. Talstra, G. Depovere, and J. Haitsma, "*Digital Watermarking for DVD Video Copy Protection*," IEEE Signal Processing Magazine, September 2000. Although these methods generally produce good protection by taking into consideration the information contents of the underlying video, they tend to consume extra processing power that can otherwise be used to improve the performance of the encoder and/or reduce the latencies caused by time-critical tasks.

As will be disclosed below, the present invention provides for an efficient implementation of video watermarking at the system level and yet produces good protection and authentication on the recorded videos.

SUMMARY OF THE INVENTION

In a broad aspect, the present invention is a correlation-based system for watermarking continuous digital media. The correlation-based system includes an application control module (ACM) including a graphical user interface (GUI). The ACM provides: i) an enable/disable control signal in response to a command by the user via the GUI; and, ii) a reset signal. A media encoder receives uncompressed media data from a media source and provides compressed media frames ($F_j$). A file system captures the compressed media data from the media encoder. A software retrieval module (SRM) retrieves the compressed media frames ($F_j$) from the file system. A first signature buffer buffers a previously generated signature ($S_{j-1}$). A second signature buffer is operatively connected to the first signature buffer for buffering a currently generated unique digital signature ($S_j$), wherein a transition from the second signature buffer to the first signature buffer occurs when a transition takes place from one frame to the next. A third signature buffer stores a predefined initial signature ($S_0$). A 2:1 multiplexer (MUX) receives an input from the first signature buffer ($S_{j-1}$), and another input from the third signature buffer ($S_0$). The reset signal from the ACM is a select control input signal to the 2:1 MUX, wherein one of the two inputs ($S_{j-1}$) and ($S_0$) is selected as the output from the 2:1 MUX depending on the logic value of the reset signal. A signature generator is operatively connected to the SRM, to the 2:1 MUX, and to the ACM, for generating a unique digital signature ($S_j$) based on i) the $F_j$, ii) the output from the 2:1 MUX, and iii) the status of the enable/disable control signal. The signature generator provides the $S_j$ to the second signature buffer if the enable/disable control signal is set to "enable". The signature generator provides no signature if the enable/disable control signal is set to "disable". An encryptor receives the unique digital signature ($S_j$) and encrypts the unique digital signature if the enable/disable control signal is set to "enable", and then stores the encrypted unique digital signature ($E_j$) to the file system. The signature generator provides no signature to the encryptor if the enable/disable control signal is set to "disable".

Use of the present invention has several advantages over the prior art. (1) The present watermarking method applies to continuous digital media data such as video or audio rather than still images. (2) The method can be applied directly to the compressed media data. Therefore, the amount of data to be processed is tremendously reduced. (3) No knowledge of the underlying media compression algorithm is required in the present method; hence the computational complexity is greatly reduced. This is contrary to many prior art systems where the watermarking techniques are built on top of the compression algorithms. (4) The present method applies directly to the compressed media frames with variable lengths rather than to the uncompressed frames with a common fixed length. This increases the difficulty of tampering without being detected. (5) A unique digital signature is to be generated per each frame based on the input data from the current compressed frame and the previous signature. No specific digital signature generation algorithm is preferred. The signature thus generated is "correlated" with the previous frame via the previously generated signature. This makes the detection of the piracy very easy, for if any frame has been modified, all the signatures corresponding to that frame and beyond will be wrong. (6) All the digital signatures are "correlatively" generated on and on until it is instructed to "reset" to the initial signature to begin a new correlated signature generation process. The control of the "reset" further creates the dynamics to the pattern of the signatures being generated, which makes the media content even more difficult from being tampered with. (7) The overall watermarking operation of the present invention can be easily implemented at the Application level, which requires very minimum system resource and therefore can be easily integrated with the entire system. (8) A fast "False Detection" program can be easily written to detect and identify which frame or frames have been tampered without the need of decoding the entire media content—a tremendous saving in time can be achieved.

The watermarking technique of the present invention is commonly applied to digital media such as video and audio. However, the same method is applicable to any digital media that are continuous in nature.

DETAILED DESCRIPTION OF THE INVENTION

Figure 1:
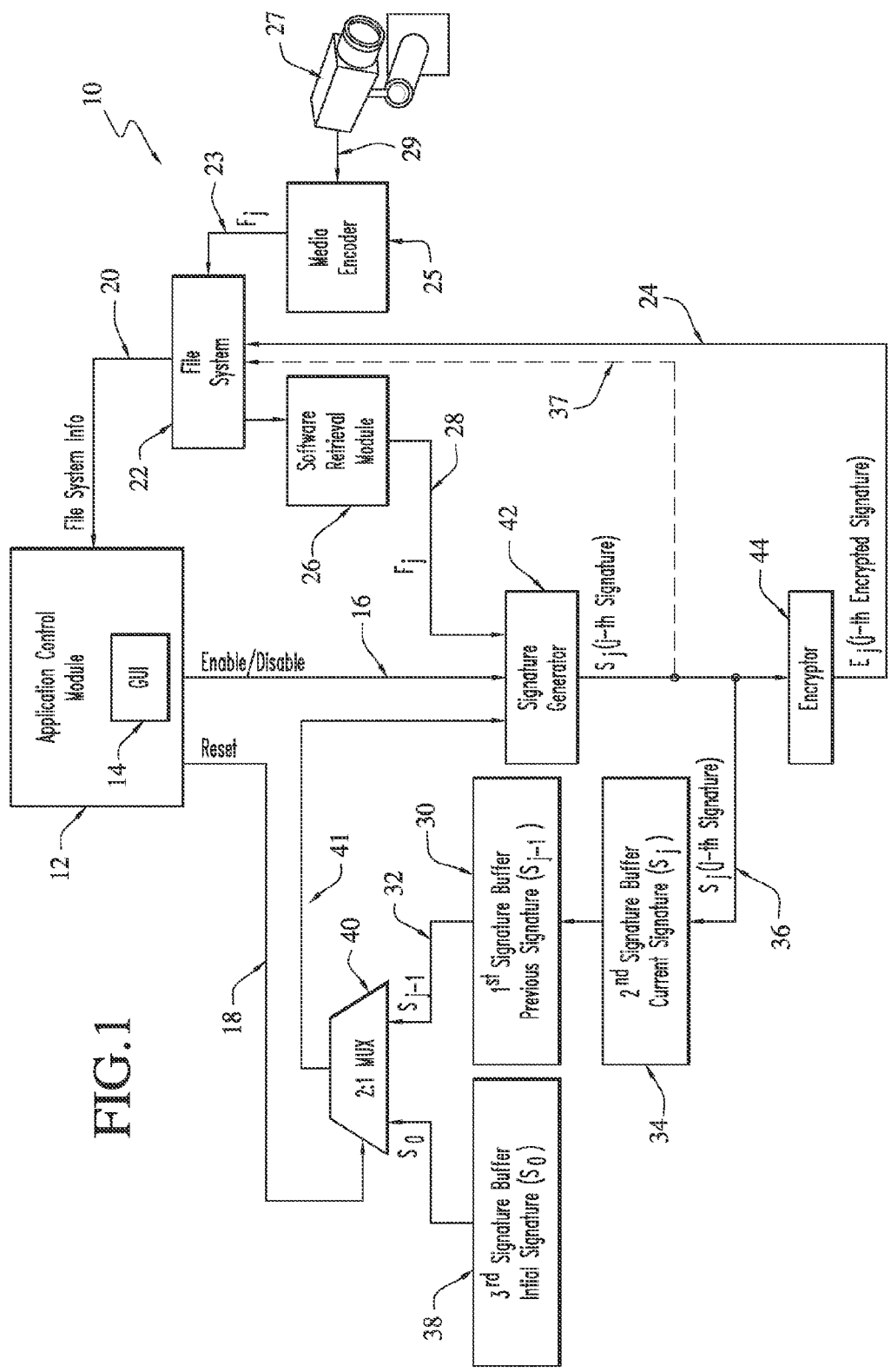
FIG. 1 is a flow diagram illustrating the correlation-based system for watermarking continuous digital media of the present invention.

Referring now to the drawings and the characters of reference marked thereon, FIG. 1 illustrates a preferred embodiment of the correlation-based system for watermarking continuous digital media of the present invention, designated generally as 10. This correlation-based system 10 includes an application control module (ACM) 12 that includes a graphical user interface (GUI) 14. The ACM 12 provides an enable/disable control signal 16 and a reset signal 18 in response to a command by the user via the GUI 14 and file system information 20, respectively. The ACM 12 may be embodied as part of application software which allows users to provide control and configuration to a typical stationary Digital Video Recording (DVR) system or a completely embedded control software in a mobile DVR system which is generally installed and operated in a mobile vehicle such as a police car or a bus.

A file system 22 captures compressed continuous media data 23 from the Media Encoder (ME) 25. The compressed continuous media data is generally embodied in forms of media frames ($F_j$). The ME 25 receives the uncompressed media data 29 from a media source such as a camera 27. The uncompressed media data 29 may be audio/video data, solely video data or solely audio data. Furthermore, it may be in analog form or digital form. If it is in analog form the media encoder 25 typically provides a conversion from analog to digital. Similarly, the compressed media data may be audio/video data, solely video data or solely audio data.

A software retrieval module (SRM) 26 retrieves the compressed media frames ($F_j$) from the file system 22, as indicated by numeral designation 28. To retrieve the frames, the SRM 26 must first perform a "File Open" function call to the File System 22 to obtain a File Pointer which points to the location of the file containing the header associated with the compressed media data. The SRM 26 then reads the length of the compressed media frame $F_j$ based on this File Pointer and calculates the Frame Pointer pointing to the location of the frame $F_j$ in the file system 22. The SRM 26 is now ready to fetch the frame data $F_j$ based on the calculated Frame Pointer. Although the SRM 26 described above is shown as a stand alone software module in FIG. 1, it is not necessarily to be included as a dedicated software module in the entire system. For example, depending on the implementation, the same functions described above for the SRM 26 can be embedded as an integral part of other software modules.

A first Signature Buffer 30 buffers the previously generated signature ($S_{j-1}$). A second Signature Buffer 34 buffers the currently generated unique digital signature ($S_j$). Thus a signature transition $S_j \rightarrow S_{j-1}$ takes place from the second Signature Buffer 34 to the first Signature Buffer 30 when a transition takes place from frame ($F_j$) to frame ($F_{j+1}$).

A third Signature Buffer 38 stores a predefined initial signature ($S_0$). Both of the signature ($S_0$) in the third Buffer 38 and the signature ($S_{j-1}$) in the first Buffer 30 are the two inputs to a 2:1 multiplexer (MUX) 40. One and only one of these inputs will be selected as the output 41 of the MUX 40 determined by the logic level of the reset signal 18 from the ACM 12. If the reset signal 18 is set to HIGH (=1), the initial signature ($S_0$) in the third Buffer will be selected as the output 41 of the MUX 40. If the reset signal 18 is reset to LOW (=0), the previously generated signature ($S_{j-1}$) in the first Buffer 30 will be selected as the output 41 of the MUX 40. The logic level of the reset signal 18 is normally set to HIGH at the beginning of the entire operation and dropped down to LOW immediately after the very first signature is generated and retained at the LOW level for the rest of the operation so that the previously generated signature ($S_{j-1}$) can always participate in the signature generation process for the current signature ($S_j$). Depending on the implementation, the reset signal 18 can be set to HIGH as many times as desired during the course of the operation.

A signal generator 42 is operatively connected to the SRM 26, the 2:1 MUX 40, and to the ACM 12, for generating a current unique digital signature ($S_j$) based on the current compressed frame $F_j$, the previously generated digital signature $S_{j-1}$ and the status of the enable/disable control signal 16. If the enable/disable control signal 16 is set to Enable by the ACM 12, the signature generator 42 will operate normally. However, if the enable/disable control signal 16 is set to Disable by the ACM 12, the signature generator 42 will be shut down and no signature will be generated, thus no watermark will be created. The setting of the enable/disable control signal 16 is normally done through a static configuration at the beginning of a recording session. However, a dynamic "re-configuration" of the enable/disable control signal 16 is possible (while a recording session is in progress), providing the new settings are properly kept by the system. The signature generator 42 provides the current signature $S_j$ 36 to the second signature buffer 34 if the enable/disable control signal 16 is set to Enable. For a production level implementation, any signature generation algorithm, such as the Cyclic Redundancy Code (CRC), can be used in the signature generator 42.

An encryptor 44 receives the unique digital signature ($S_j$) 35 and encrypts the unique digital signature if the enable/disable control signal 16 is set to Enable. Any suitable reversible encryption algorithm (e.g., 64/128-bit AES/DES) can be employed in the encryptor 44. The encrypted unique digital signature ($E_j$) 24 is stored in the file system 22. Although (for security reasons) the encryptor 44 is a preferred implementation, it may not constitute a critical element of the present invention. Therefore its implementation may be optionally eliminated. If this is the case, then the unique digital signature ($S_j$) 37 generated by the signature generator 42 will be stored to the file system 22 directly.

Figure 2:
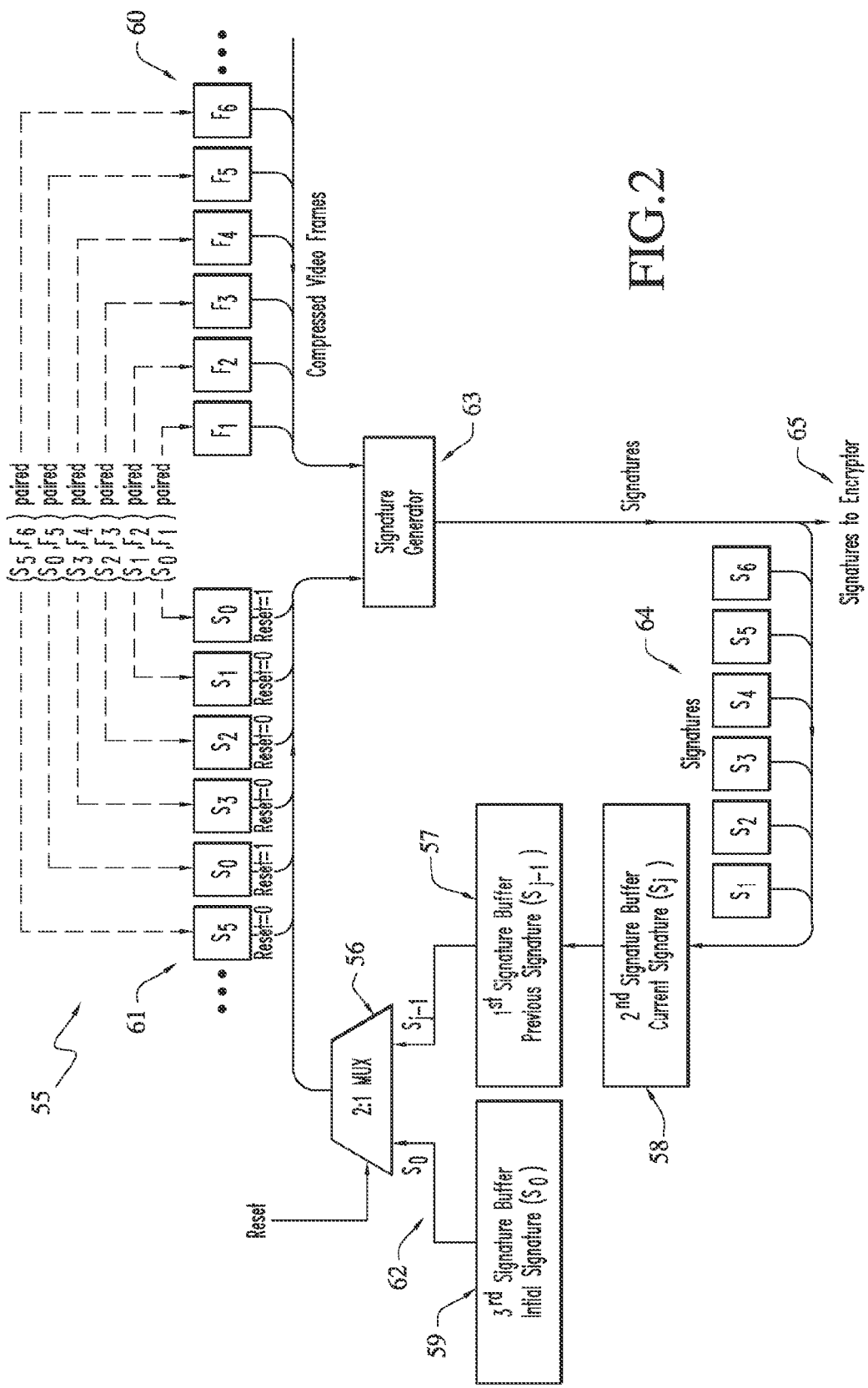
FIG. 2 is a flow diagram illustrating an example of the operation of the present invention.

Referring now to FIG. 2 and FIGS. 3A-3F, FIG. 2 shows an example during the operation of the present system, designated generally as 55; and, FIGS. 3A-3F illustrate the FIG. 2 example with step-by-step details, designated generally as 70, 90, 110, 130, 150, and 170, respectively. As depicted in FIG. 2, both video frames 60 and the signatures 61 are correlated through a 2:1 multiplexer 56, three buffers: the first signature buffer 57, the second signature buffer 58, the third signature buffer 59, and the signature generator 63. An initial signature $S_0$ 62 will be preloaded to the third signature buffer 59 by the application. The generated signatures 64 from the signature generator 63 will be sent to the encryptor, as shown by numeral designation 65, as well as stored in the second signature buffer 58.

Figure 3A:
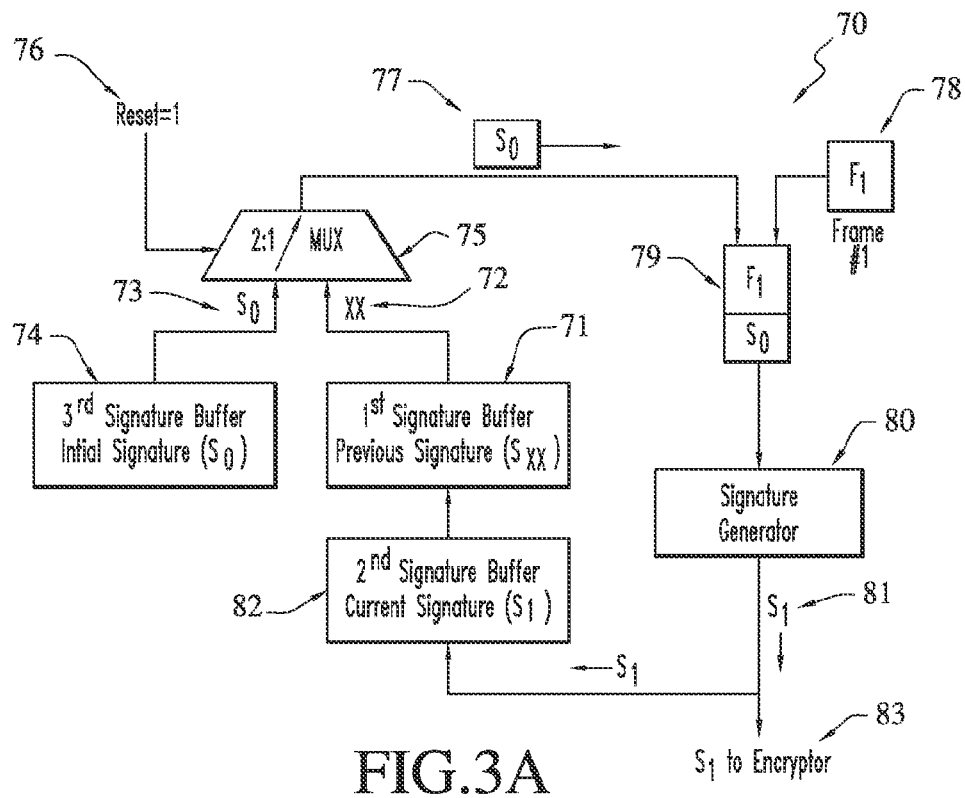
FIGS. 3A-3F illustrate the FIG. 2 example with step-by-step details.

Referring now to FIG. 3A, in an initial step, designated generally as 70, before the entire operation starts, the first signature buffer 71, which is used to store the previously generated signature, will contain some value XX 72 (which is irrelevant to the operation). At the very beginning of the process, both $S_0$ 73 in the third buffer 74 and XX 72 in the first buffer 71 are the inputs to the 2:1 multiplexer 75. The reset signal 76 is set to HIGH (binary 1) initially by the application. This setting will select the initial signature $S_0$ 77 as the output from the multiplexer 75. This output will then be concatenated with the first frame $F_1$ 78 to form a new frame $S_0 \| F_1$ 79, which in turn will be the input to the signature generator 80. The first signature $S_1$ 81 will then be generated and output from the signature generator 80 to the second signature buffer 82 as well as the encryptor 83.

Figure 3B:
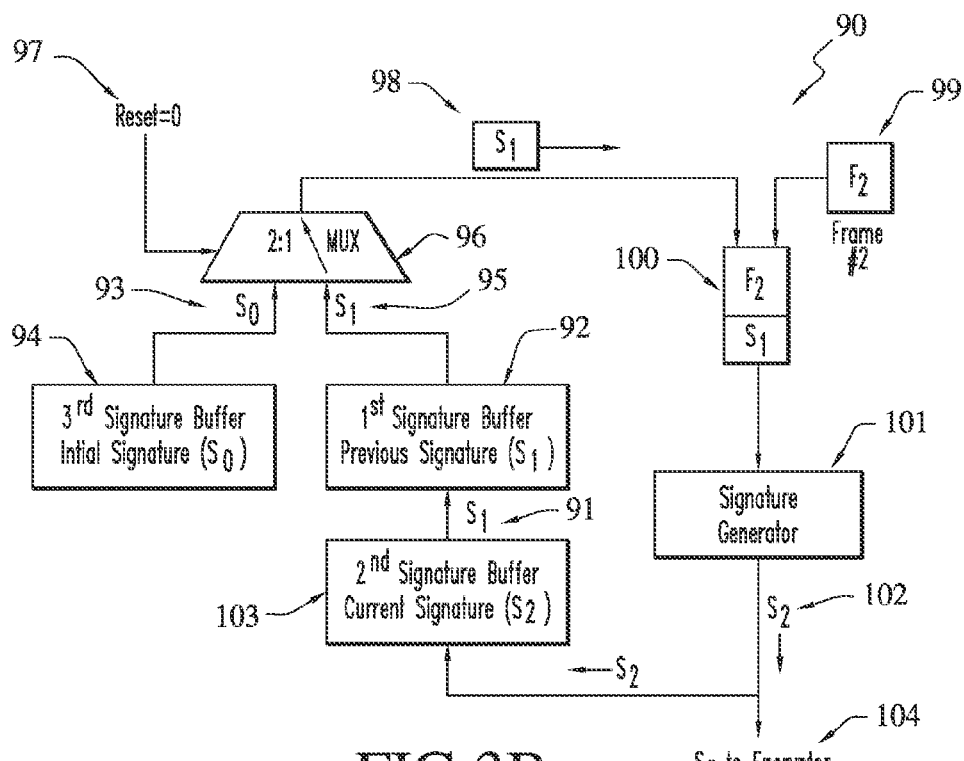

Referring now to FIG. 3B, in a transition step designated generally as 90, as soon as the generation of the first signature $S_1$ is completed, as shown in FIG. 3A, the process transitions from the first frame to the second frame. During this transition, the signature $S_1$ 91 residing previously in the second signature buffer 103 will be stored to the first signature buffer 92. Both of the signatures $S_0$ 93 in the third signature buffer 94 and $S_1$ 95 in the first signature buffer 92 will be the inputs to the 2:1 multiplexer 96. The application control module 12 will then reset the reset signal 97 to LOW (binary 0). This setting will select the signature $S_1$ 98 in the first signature buffer 92 as the output from the multiplexer 96. This output will then be concatenated with the second frame $F_2$ 99 to form a new frame $S_1 \| F_2$ 100, which in turn will be the input to the signature generator 101. The second signature $S_2$ 102 will then be generated and output from the signature generator 101 to the second signature buffer 103 as well as the encryptor 104.

Figure 3C:
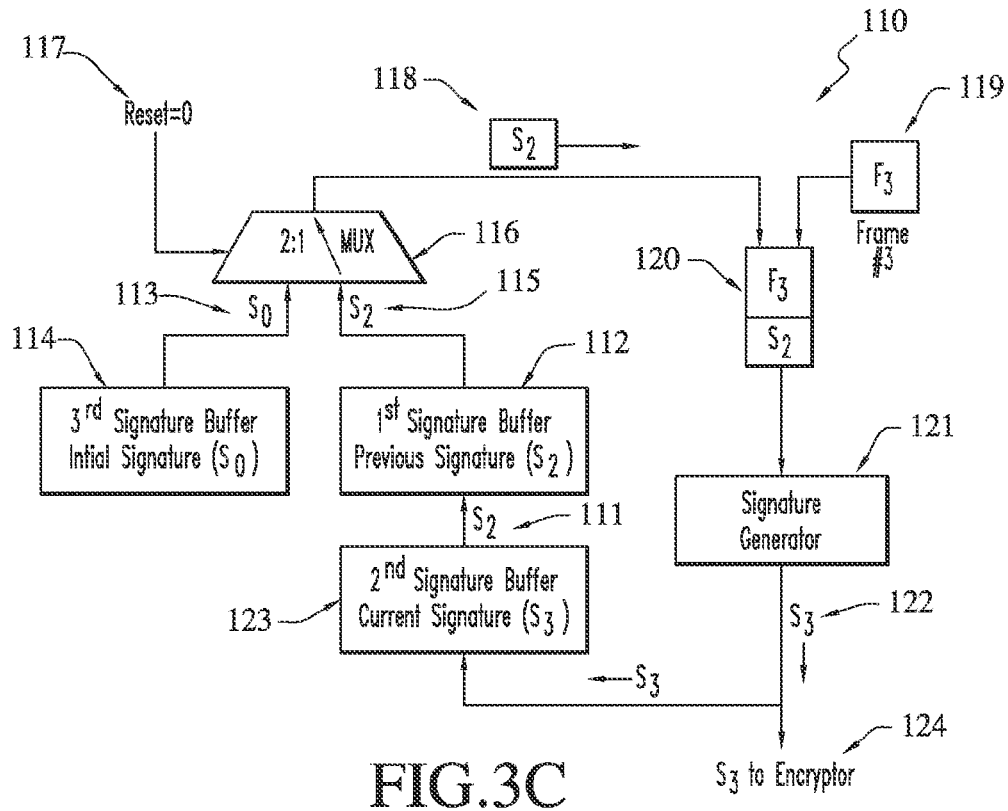

Referring now to FIG. 3C, in a transition step designated generally as 110, as soon as the generation of the second signature $S_2$ is completed, as shown in FIG. 3B, the process transitions from the second frame to the third frame, as shown in FIG. 3C. During this transition, the signature $S_2$ 111 residing previously in the second signature buffer 123 will be stored to the first signature buffer 112. Both of the signatures $S_0$ 113 in the third signature buffer 114 and $S_2$ 115 in the first signature buffer 112 will be the inputs to the 2:1 multiplexer 116. The reset signal 117 retains at LOW (binary 0). This setting will select the signature $S_2$ 118 in the first signature buffer 112 as the output from the multiplexer 116. This output will then be concatenated with the third frame $F_3$ 119 to form a new frame $S_2 \| F_3$ 120, which in turn will be the input to the signature generator 121. The third signature $S_3$ 122 will then be generated and output from the signature generator 121 to the second signature buffer 123 as well as the encryptor 124.

Figure 3D:
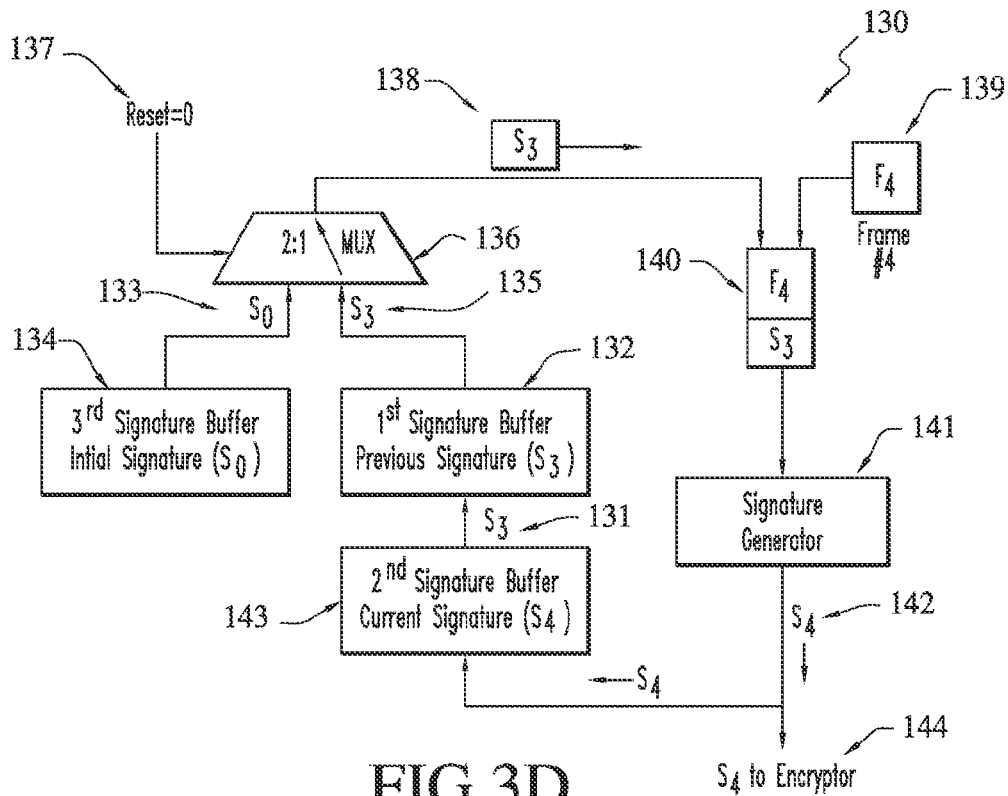

Referring now to FIG. 3D, in a transition step, designated generally as 130, as soon as the generation of the third signature $S_3$ is completed, as shown in FIG. 3C, the process transitions from the third frame to the forth frame, as is shown in FIG. 3D. During this transition, the signature $S_3$ 131 residing previously in the second signature buffer 143 will be stored to the first signature buffer 132. Both of the signatures $S_0$ 133 in the third signature buffer 134 and $S_3$ 135 in the first signature buffer 132 will be the inputs to the 2:1 multiplexer 136. The reset signal 137 retains at LOW (binary 0). This setting will select the signature $S_3$ 138 in the first signature buffer 132 as the output from the multiplexer 136. This output will then be concatenated with the forth frame $F_4$ 139 to form a new frame $S_3 \| F_4$ 140, which in turn will be the input to the signature generator 141. The fourth signature $S_4$ 142 will then be generated and output from the signature generator 141 to the second signature buffer 143 as well as the encryptor 144.

Figure 3E:
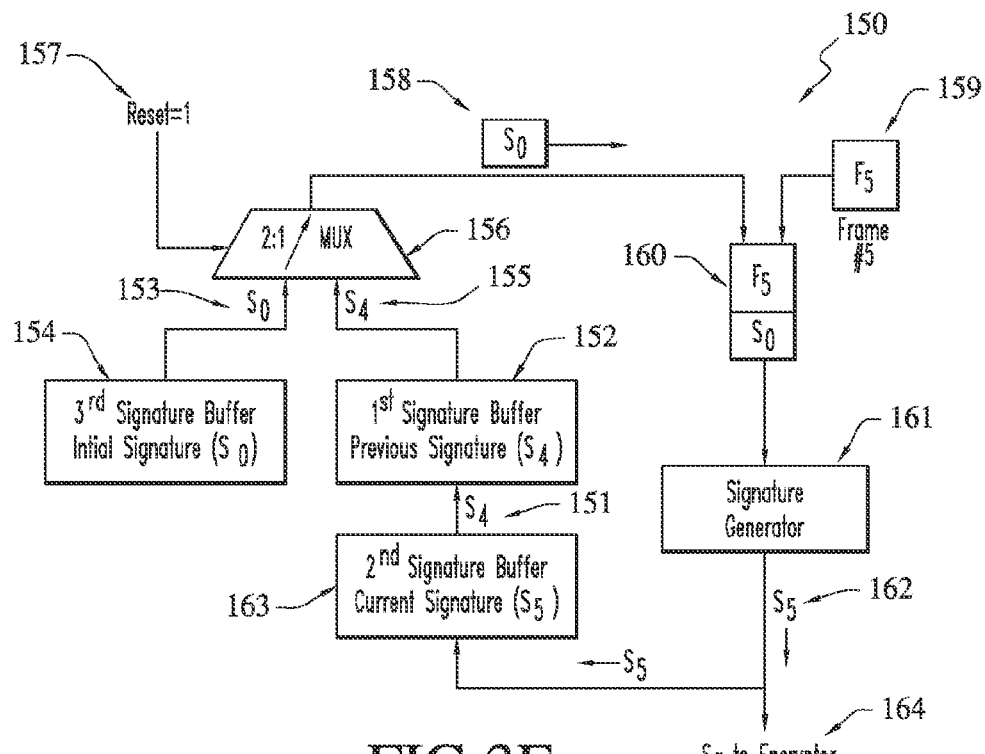

Referring to FIG. 3E, in a transition step, designated generally as 150, as soon as the generation of the forth signature $S_4$ is completed, as shown in FIG. 3D, the process transitions from the forth frame to the fifth frame, as is shown in FIG. 3E. During this transition, the signature $S_4$ 151 residing previously in the second signature buffer 163 will be stored to the first signature buffer 152. Both of the signatures $S_0$ 153 in the third signature buffer 154 and $S_4$ 155 in the first signature buffer 152 will be the inputs to the 2:1 multiplexer 156. The reset signal 157 now is set back to HIGH (binary 1) by the application. This setting will select the initial signature $S_0$ 158 in the third signature buffer 154 as the output from the multiplexer 156. This output will then be concatenated with the fifth frame $F_5$ 159 to form a new frame $S_0 \| F_5$ 160, which in turn will be the input to the signature generator 161. The fifth signature $S_5$ 162 will then be generated and output from the signature generator 161 to the second signature buffer 163 as well as the encryptor 164.

Figure 3F:
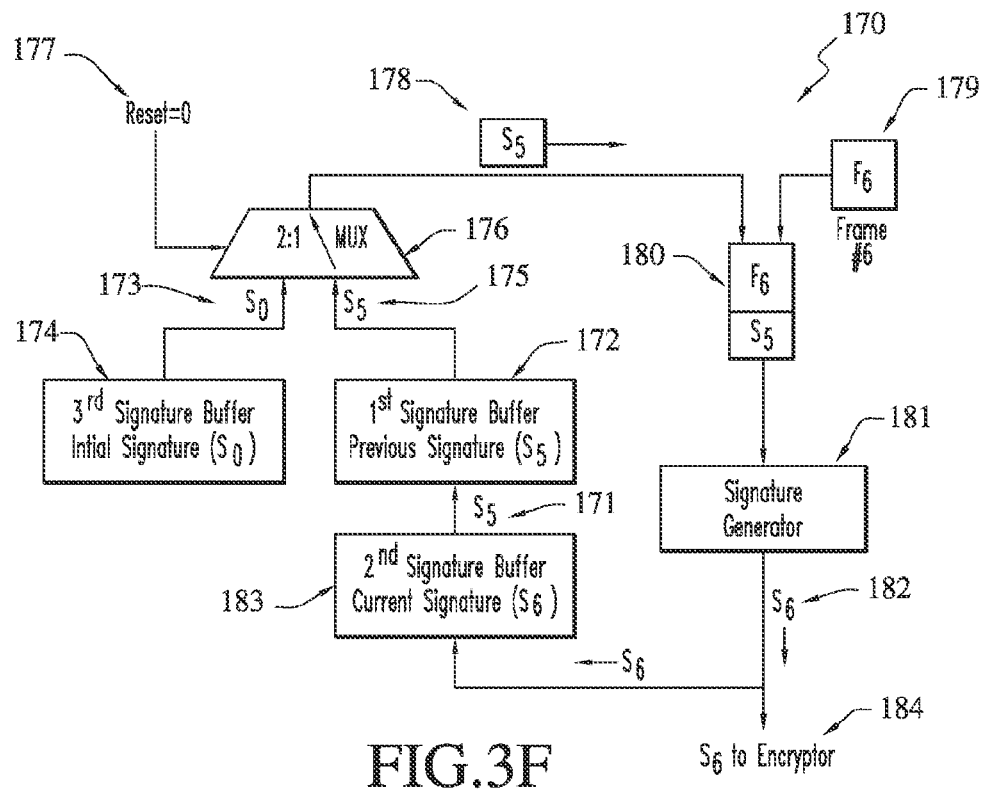

Referring to FIG. 3F, in a transition step, designated generally as 170, as soon as the generation of the fifth signature $S_5$ is completed, as shown in FIG. 3E, the process transitions from the fifth frame to the sixth frame, as is shown in FIG. 3F. During this transition, the signature $S_5$ 171 residing previously in the second signature buffer 183 will be stored to the first signature buffer 172. Both of the signatures $S_0$ 173 in the third signature buffer 174 and $S_5$ 175 in the first signature buffer 172 will be the inputs to the 2:1 multiplexer 176. The reset signal 177 now is reset back to LOW (binary 0) by the application. This setting will select the signature $S_5$ 178 in the first signature buffer 172 as the output from the multiplexer 176. This output will then be concatenated with the sixth frame $F_6$ 179 to form a new frame $S_5 \| F_6$ 180, which in turn will be the input to the signature generator 181. The sixth signature $S_6$ 182 will then be generated and output from the signature generator 181 to the second signature buffer 183 as well as the encryptor 184.

Generally speaking, the above process will generate a current unique digital signature $S_j$ based on the current compressed frame $F_j$ and the previously generated digital signature $S_{j-1}$. The current unique digital signature $S_j$ thus generated will then be used in conjunction with the next compressed frame $F_{j+1}$ to generate the next unique digital signature $S_{j+1}$. This process continues over and over again till the entire process is terminated or the Enable/Disable signal 16 in system 10 is changed to "Disable" by the application.

Although the system of the present invention has been described as having the file system information 20 being provided to the ACM 12 and the ACM 12 providing the reset signal 18 in response to the file system information there are other potential implementations. For example, the reset signal 18 can be set by the ACM 12 per every N frames, where N is an arbitrary positive integer, or set by the ACM 12 whenever a new recording session begins. In general, the reset signal 18 can be set by the ACM 12 in a "random" fashion which is known only to the implementation. The advantage of controlling the time to set the reset signal 18 in a random fashion is that it creates the "dynamics" to the signature generation process that is hardly reproduced at the time the media content is ever tampered.

As noted above, a fast "False Detection" program can be easily written to detect and identify which frame or frames have been tampered without the need of decoding the entire media content. The writing of such a program can be accomplished by one skilled in the art. For example, if a user's interest is only to detect if the media content has ever been tampered, a program can be written to re-generate the unique digital signature per each compressed media frame according to the method described relative to system 10. The identical settings of the reset control signal 18 and the enable/disable control signal 16 in system 10 which are used to generate the original watermarks will now be used by this program. Since no decompression of the media is needed in this case, the detection program can be implemented very fast. The re-generated signatures will then be compared with the original signatures which are already stored in the file system 22. If the original signatures were encrypted, they need to be decrypted before the comparison can take place. A "False" is detected if a miss-compare occurs. The False Detection program can also be implemented while the decompression of the media is in progress (i.e., the media is being played back). However in this case, the detection program can only show the detection of the temporal occurrences of tampered frames at the speed of the playback.

Other embodiments and configurations may be devised without departing from the spirit of the invention and the scope of the appended claims.

The invention claimed is:

1. A correlation-based system for watermarking continuous digital media, comprising:
    a) an application control module (ACM) including a graphical user interface (GUI), said ACM for providing: i) an enable/disable control signal in response to a command by the user via the GUI; and, ii) a reset signal;
    b) a media encoder for receiving uncompressed media data from a media source and providing compressed media frames ($F_j$);
    c) a file system for capturing said compressed media data from said media encoder;
    d) a software retrieval module (SRM) for retrieving said compressed media frames ($F_j$) from said file system;
    e) a first signature buffer for buffering a previously generated signature ($S_{j-1}$);
    f) a second signature buffer operatively connected to said first signature buffer for buffering a currently generated unique digital signature ($S_j$), wherein a transition from said second signature buffer to said first signature buffer occurs when a transition takes place from one frame to the next;
    g) a third signature buffer for storing a predefined initial signature ($S_0$);
    h) a 2:1 multiplexer (MUX) for receiving an input from said first signature buffer ($S_{j-1}$), and another input from said third signature buffer ($S_0$), said reset signal from said ACM being a select control input signal to said 2:1 MUX, wherein one of the two inputs ($S_{j-1}$) and ($S_0$) are selected as the output from said 2:1 MUX depending on the logic value of said reset signal;
    i) a signature generator operatively connected to said SRM, to said 2:1 MUX, and to said ACM, for generating a unique digital signature ($S_j$) based on 1) said $F_j$, 2) said output from said 2:1 MUX, and 3) the status of said enable/disable control signal, wherein said signature generator provides said $S_j$ to said second signature buffer if said enable/disable control signal is set to "enable", said signature generator providing no signature if said enable/disable control signal is set to "disable"; and,
    j) an encryptor for receiving said unique digital signature ($S_j$) and for encrypting said unique digital signature if said enable/disable control signal is set to "enable", said signature generator providing no signature to said encryptor if said enable/disable control signal is set to "disable", the encrypted unique digital signature ($E_j$) being stored in said file system.

2. The correlation-based system of claim 1 wherein said file system provides file system information to said ACM, said ACM providing said reset signal in response to said file system information.

3. The correlation-based system of claim 1 wherein said uncompressed media data comprises analog data.

4. The correlation-based system of claim 1 wherein said uncompressed media data comprises digital data.

5. The correlation-based system of claim 1 wherein said compressed media data comprises digital audio/video media data.

6. The correlation-based system of claim 1 wherein said compressed media data comprises digital video media data.

7. The correlation-based system of claim 1 wherein said compressed media data comprises digital audio media data.

8. The correlation-based system of claim 1 wherein said file system comprises a file system that stores files containing continuous media data.

9. The correlation-based system of claim 1 wherein said signature generator generates a unique digital signature of a desired length in binary bits based on the desired binary input data.

10. The correlation-based system of claim 1 wherein said initial signature comprises a binary data of any number of binary bits that is predetermined by the underlying implementation.

11. The correlation-based system of claim 1 wherein said reset signal provides control to select either said predetermined initial signature ($S_0$) or said previously generated signature ($S_{j-1}$) to participate in the current signature generation process in said signature generator.

12. The correlation-based system of claim 1 wherein said encryptor comprises a reversible encryption process/algorithm for encrypting said unique digital signature ($S_j$) and providing said encrypted unique digital signature ($E_j$).

13. A correlation-based method for watermarking continuous digital media, comprising the steps of:
    a) i) providing an enable/disable control signal in response to a command by a user via a graphical user interface (GUI); and, ii) providing a reset signal, said enable/disable control signal and said reset signal being provided by an application control module (ACM) including said GUI;
    b) receiving uncompressed media data from a media source and providing compressed media frames ($F_j$);
    c) capturing said compressed media data in a file system;
    d) retrieving said compressed media frames ($F_j$);
    e) buffering a previously generated signature ($S_{j-1}$) utilizing a first signature buffer;
    f) buffering a currently generated unique digital signature ($S_j$) utilizing a second signature buffer, wherein a transition from said second signature buffer to said first signature buffer occurs when a transition takes place from one frame to the next;
    g) storing a predefined initial signature ($S_0$) utilizing a third signature buffer;
    h) receiving an input from said first signature buffer ($S_{j-1}$), and another input from said third signature buffer ($S_0$) utilizing a 2:1 multiplexer (MUX), said reset signal from said ACM being a select control input signal to said 2:1 MUX, wherein one of the two inputs ($S_j$) and ($S_0$) are selected as the output from said 2:1 MUX depending on the logic value of said reset signal;

i) generating a unique digital signature ($S_j$) based on 1) said $F_j$, 2) said output from said 2:1 MUX, and 3) the status of said enable/disable control signal, said $S_j$ utilizing a signature generator, wherein said signature generator provides said $S_j$ to said second signature buffer if said enable/disable control signal is set to "enable", said signature generator providing no signature if said enable/disable control signal is set to "disable"; and j) receiving said unique digital signature ($S_j$) and encrypting said unique digital signature if said enable/disable control signal is set to "enable", said signature generator providing no signature for encryption if said enable/disable control signal is set to "disable", the encrypted unique digital signature ($E_j$) being stored in said file system.

14. The correlation-based method of claim 13 further including the step of utilizing said file system to provide file system information to said ACM, said ACM providing said reset signal in response to said file system information.

15. The correlation-based method of claim 13 wherein said step of generating a unique digital signature comprises generating a unique digital signature of a desired length in binary bits based on the desired binary input data.

16. A correlation-based system for watermarking continuous digital media, comprising:
   a) an application control module (ACM) including a graphical user interface (GUI), said ACM for providing: i) an enable/disable control signal in response to a command by the user via the GUI; and, ii) a reset signal;
   b) a media encoder for receiving uncompressed media data from a media source and providing compressed media frames ($F_j$);
   c) a file system for capturing said compressed media data from said media encoder;
   d) a software retrieval module (SRM) for retrieving said compressed media frames ($F_j$) from said file system;
   e) a first signature buffer for buffering a previously generated signature ($S_{j-1}$);
   f) a second signature buffer operatively connected to said first signature buffer for buffering a currently generated unique digital signature ($S_j$), wherein a transition from said second signature buffer to said first signature buffer occurs when a transition takes place from one frame to the next;
   g) a third signature buffer for storing a predefined initial signature ($S_0$);
   h) a 2:1 multiplexer (MUX) for receiving an input from said first signature buffer ($S_{j-1}$), and another input from said third signature buffer ($S_0$), said reset signal from said ACM being a select control input signal to said 2:1 MUX, wherein one of the two inputs ($S_{j-1}$) and ($S_0$) are selected as the output from said 2:1 MUX depending on the logic value of said reset signal; and,
   i) a signature generator operatively connected to said SRM, to said 2:1 MUX, and to said ACM, for generating a unique digital signature ($S_j$) based on 1) said $F_j$, 2) said output from said 2:1 MUX, and 3) the status of said enable/disable control signal, wherein said signature generator provides said $S_j$ to said second signature buffer if said enable/disable control signal is set to "enable", said signature generator providing no signature if said enable/disable control signal is set to "disable", wherein said file system receives and stores said unique digital signature ($S_j$) if said enable/disable control signal is set to "enable", said signature generator providing no signature to said file system if said enable/disable control signal is set to "disable".

17. A correlation-based method for watermarking continuous digital media, comprising the steps of:
   a) i) providing an enable/disable control signal in response to a command by a user via a graphical user interface (GUI); and, ii) providing a reset signal, said enable/disable control signal and said reset signal being provided by an application control module (ACM) including said GUI;
   b) receiving uncompressed media data from a media source and providing compressed media frames ($F_j$);
   c) capturing said compressed media data in a file system;
   d) retrieving said compressed media frames ($F_j$);
   e) buffering a previously generated signature ($S_{j-1}$) utilizing a first signature buffer;
   f) buffering a currently generated unique digital signature ($S_j$) utilizing a second signature buffer, wherein a transition from said second signature buffer to said first signature buffer occurs when a transition takes place from one frame to the next;
   g) storing a predefined initial signature ($S_0$) utilizing a third signature buffer;
   h) receiving an input from said first signature buffer ($S_{j-1}$), and another input from said third signature buffer ($S_0$) utilizing a 2:1 multiplexer (MUX), said reset signal from said ACM being a select control input signal to said 2:1 MUX, wherein one of the two inputs ($S_{j-1}$) and ($S_0$) are selected as the output from said 2:1 MUX depending on the logic value of said reset signal; and,
   i) generating a unique digital signature ($S_j$) based on 1) said $F_j$, 2) said output from said 2:1 MUX, and 3) the status of said enable/disable control signal, said $S_j$ utilizing a signature generator, wherein said signature generator provides said $S_j$ to said second signature buffer if said enable/disable control signal is set to "enable", said signature generator providing no signature if said enable/disable control signal is set to "disable", wherein said file system receives and stores said unique digital signature ($S_j$) if said enable/disable control signal is set to "enable", said signature generator providing no signature to said file system if said enable/disable control signal is set to "disable".

18. A cross-correlation based method for watermarking continuous digital media, comprising the steps of:
   a) retrieving at least one signature parameter ($S_j$) determined according to a corresponding previous signature ($S_{j-1}$) or a predefined initial signature ($S_0$), said $S_0$ being selectable by a user command via a reset signal to a multiplexor that selects either $S_0$ or $S_j$ during the course of generating a signature; and,
   b) encrypting the present signature according to said at least one signature parameter ($S_j$) to generate a unique digital signature ($E_j$).

* * * * *